Patented June 24, 1930

1,766,815

UNITED STATES PATENT OFFICE

HARRY C. FISHER, OF LOCKLAND, OHIO, ASSIGNOR, BY MESNE ASSIGNMENTS, TO THE PHILIP CAREY MANUFACTURING COMPANY, A CORPORATION OF OHIO

PROCESS FOR COLORING MINERAL MATTER

No Drawing.   Application filed October 13, 1926. Serial No. 141,432.

My invention relates to processes for coloring granular mineral matter, particularly granulated slate, for use in the surfacing of prepared roofing and coatings for mastic surfaces in general.

I have in the past developed processes for the coloring of mineral, and particularly slate granules, which fall into several distinct classes, of which several are of the same general type as my present invention.

My several processes differ quite radically from the coloring of ceramic materials with glazes, in that the requirements are for the treatment of large bulk of initially dry, stony material in granular form in a continuous manner, and with great economy in materials used for coloring. Considerable difficulty is met with due to the fact that the materials themselves upon which the color is superimposed, have a disagreeable color when passed through a roasting treatment, and this color must be obscured without the use of so much glazing or coating material, as to cement the granules together, or sufficient quantities of coating ingredients as to raise the cost beyond requirements of economy.

One of my processes is to treat granular slate or other mineral matter with an alkaline silicate in the presence of coloring matter, and then passing the materials through a rotary kiln with a counterflow of products of combustion, with sufficient final roasting temperature to cause the silicate to become fully dehydrated, without passing into the stage of a true glass by fusion. The coatings so formed have the quality of opacity, due to a frothing action of the silicate, which, in the absence of coloring matter, would form a whitish and equally opaque coating. Such a process is described in my copending application Ser. No. 26,829 filed Apr. 29, 1925.

Another process is to employ the same silicate in perhaps greater concentration, and give the same roasting treatment, except that the heat is brought considerably higher, resulting in a fusing of the silicate after it has become dehydrated and a regeneration of the original glass from which the silicate in soluble form was originally produced by solution in water. In this process, some flux is used, principally to avoid too extreme a roasting temperature, although the specific colors obtainable by using various fluxes can be taken advantage of also. In addition, there is a certain small amount of interaction between the fused solution and the surface of the slate. Such a process is described in my copending application Ser. No. 141,431 filed Oct. 13, 1928.

In this latter form of the "silicate" process, the possibility of obtaining light colors in an economical manner is not contemplated, since the process requires thin films on the granules, as has been noted above, and when these films are a true glaze, the dark color of the roasted mineral matter will impart a dark shade to whatever pigment may be employed, and certain elements of the slate itself will enter the glaze, likewise darkening it.

My present process is directed to the formation of lighter colors, and colors in general, as coatings on granular mineral matter and slate, in which a true glass or glaze is formed on the outer surface, in which the use of an alkaline silicate is incidental.

It is a variant of the two silicate processes above noted, and a further process which I have developed in the past, to wit: the forming of a metal glass on granular mineral matter by the interaction of a body of silicate and a metal salt such as lead acetate, and using a solution or suspension thereof together with some suitable pigment such as iron oxide, or other metal oxides on the granules, together with enough flux to lower the temperature requirements. This process forms an insoluble metal glass on the granules, which is shiny in appearance, and very permanent upon exposure to the weather.

In my present process, silicate is used as an adhesive agent, and can be replaced with other adhesives, such as a vegetable or animal glue, which will disappear after serving the function of holding the coating materials in place during the initial stages of the process.

As an example which will be typical for the use of similar materials for forming glasses, I may employ a combination of materials in making a red glaze or glass on a ton of granulated slate the following:

44 pounds powdered silica.
41 pounds red lead.
6 pounds sodium carbonate.
8 pounds red iron oxide.
3 pounds magnesium oxide.
80 pounds borax.
75 pounds water.

These materials will be in part soluble and part insoluble, and will be mixed with the slate granules together with say 50 pounds of sodium silicate to make the slurry adhesive to the slate. The silicate may be omitted, and glue used in its place, or no adhesive may be used, in which case care must be taken to get a full coating on the granules of the slurry. Silicate is preferred because it enters the glaze, and is not dissipated, and hence adds to the permanent binding nature of the glaze and its thickness.

The coated granular material is passed through a rotary kiln, thus receiving agitation to prevent balling up, and the heating medium flows through the kiln in the opposite direction, for example, the products of combustion from oil burners.

The final temperature of the treatment should be, for the materials selected in the example, around 1400 degrees Fahrenheit, with an oxidizing atmosphere.

The final product, i. e. the coated granules, will not adhere together in balls, due in part to the small quantity of coating medium used, and also due to cooling in air, after the high heat treatment, which leaves the granules easily separated and fully coated each with the glass of desired color.

The product of the process now described by a typical example will be quite permanent when exposed to the weather; the color of the slate beneath will be obscured, and due to the low fusion or solution point of the materials forming the coating, commercial practice will not require a temperature that will blacken the slate too much, thus affecting the final color.

The process may be classed as the formation of an adhesive slurry or merely a slurry of glass forming materials other than alkaline silicates, some of the materials being in suspension and some in solution, imposing the slurry on the granulated material, then heating to cause the materials to pass through a drying stage where the water is eliminated, and finally raising the temperature to a fusion or solution stage, when the glass is formed, and adheres permanently to the granules, the mass being cooled in air.

A wide range of materials for coloring matter may be employed, and various colors produced. The process will be considerably more expensive than the true silicate processes above referred to, but permits of obtaining different effects.

Having thus described my process, what I claim as new and desire to secure by Letters Patent is:—

1. That process of forming a glaze on mineral granules, which consists in forming a slurry of glass forming materials, some of which are insoluble, imposing said slurry upon the granulated mineral matter, and heat treating the product with agitation to a temperature to cause a formation of a glass from said glass forming materials.

2. That process of forming a glaze on mineral granules, which consists in forming a slurry of glass forming materials, some of which are insoluble, together with appropriate coloring agents, imposing said slurry upon the granulated mineral matter, and heat treating the product with agitation to a temperature to cause a formation of a glass from said glass forming materials.

3. That process of forming a glaze on mineral granules, which consists in forming a slurry of glass forming materials, some of which are insoluble, together with an adhesive, imposing said slurry upon the granulated mineral matter, and heat treating the product with agitation to a temperature to cause a formation of a glass from said glass forming materials.

4. That process of forming a glaze on mineral granules, which consists in forming a slurry of glass forming materials, some of which are insoluble, together with an adhesive and appropriate coloring agents, impossing said slurry upon the granulated mineral matter, and heat treating the product with agitation to a temperature to cause a formation of a glass from said glass forming materials.

5. That process of forming a glaze on mineral granules, which consists in forming a slurry of glass forming materials, some of which are insoluble, together with an alkaline silicate, imposing said slurry upon the granulated mineral matter, and heat treating the product with agitation to a temperature to cause a formation of a glass from said glass forming materials.

6. That process of forming a glaze on mineral granules, which consists in forming a slurry of glass forming materials, some of which are insoluble, together with an alkaline silicate and appropriate coloring agents, imposing said slurry upon the granulated mineral matter, and heat treating the product with agitation to a temperature to cause a formation of a glass from said glass forming materials.

HARRY C. FISHER.